(12) United States Patent
Aldrich

(10) Patent No.: US 7,566,218 B2
(45) Date of Patent: Jul. 28, 2009

(54) BURNER ASSEMBLY

(75) Inventor: Chris Aldrich, Sundre (CA)

(73) Assignee: ACL Manufacturing Inc., Sundre (CA)

( * ) Notice: Subject to any disclaimer, the term of this patent is extended or adjusted under 35 U.S.C. 154(b) by 736 days.

(21) Appl. No.: 11/162,551

(22) Filed: Sep. 14, 2005

(65) Prior Publication Data

US 2006/0057518 A1     Mar. 16, 2006

(30) Foreign Application Priority Data

Sep. 14, 2004   (CA)  ................................ 2481536

(51) Int. Cl.
*F23M 9/00*     (2006.01)
(52) U.S. Cl. ........................... 431/185; 431/9; 431/183; 431/187; 431/354
(58) Field of Classification Search ................ 431/185, 431/9, 10, 12, 183, 187, 189, 265, 351
See application file for complete search history.

(56) References Cited

U.S. PATENT DOCUMENTS

| | | | | |
|---|---|---|---|---|
| 4,424,793 A | * | 1/1984 | Cooperrider | ............ 126/110 B |
| 4,978,293 A | * | 12/1990 | Ryno | ......................... 431/258 |
| 6,048,197 A | * | 4/2000 | Beiler | ......................... 431/265 |
| 6,368,101 B1 | | 4/2002 | Briggs et al. | |
| 6,382,959 B2 | | 5/2002 | Turk et al. | |

* cited by examiner

*Primary Examiner*—Alfred Basichas
(74) *Attorney, Agent, or Firm*—Sean W Goodwin; Linda M. Thompson

(57) ABSTRACT

A burner assembly has a burner head and a deflector plate extending radially therefrom and across a firetube housing for supporting the burner assembly therein. The deflector plate has a plurality of angled vanes for re-directing secondary combustion air flowing through the housing. Secondary air is deflected away from a nozzle tip at the burner head to minimize lifting of the flame by the deflector plate or by a low pressure ring formed around the nozzle tip above the deflector plate for creating an area of low pressure. Preferably, a combination of the deflector plate and low pressure ring provides a stable flame positioned at the nozzle tip under low-fire and high-fire conditions enabling use of a pilotless ignition and flame sensing system which is consistent under low and high fire conditions. More preferably, the deflector plate supports the igniter and optionally a heat return tube for heat tracing of the freeze-prone burner assembly components.

22 Claims, 9 Drawing Sheets

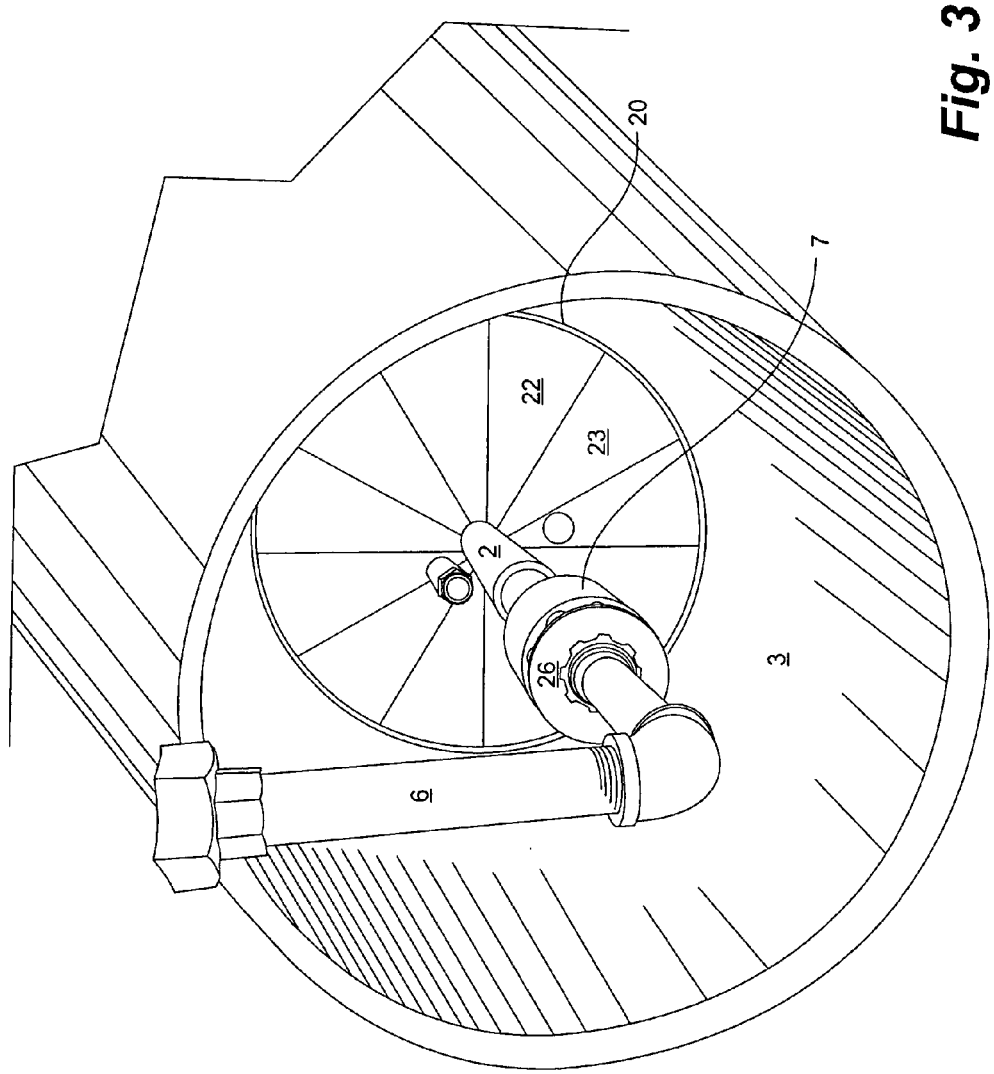

A-A

C-C

BURNER ASSEMBLY

FIELD OF THE INVENTION

The present invention relates to the field of burners and particularly to gas burners used in industrial heaters.

BACKGROUND OF THE INVENTION

It is well known in a variety of industries to use heaters having burner assemblies for a number of different applications, including kilns, drying apparatus, furnaces and for preventing freezing of tanks and pipelines. In the oil and gas industry, heaters are particularly used in regions where low ambient temperatures may result in freezing of storage tanks or in production and process pipelines. Further process heaters are used which may be used when knocking water out of oil and when heating salt baths and the like. Gas burner assemblies are typically arranged in a housing or firetube which extends into a storage or holding tank to be heated.

In prior art natural draft or "non-forced draft" situations, primary combustion air is drawn into a mixing chamber or mixer head of the gas burner assembly as a result of the velocity of the flammable gas entering the mixing chamber or venturi. The premixed gas/air fuel mixture exits the venturi at a burner nozzle, typically a rosebud nozzle, where the mixture is ignited. Secondary combustion air is drawn into the housing and around the burner assembly as a result of draft. The secondary air, intended to aid in combustion, may adversely affect the operation of the burner assembly. Large volumes of secondary air creating a large turbulent draft at the burner head may result in the flame being lifted from the burner nozzle or may blow out a flame at the nozzle. Attempts to reduce or dampen the amount of secondary air entering the burner can substantially shutoff the flow of secondary air which compromises the efficiency of the burner.

Further, variability in operation can adversely affect the consistency of ignition and flame sensing. Typically, burners may be operated in high-fire and low-fire situations. In a low-fire situation, the pressure of fuel entering the burner is relatively low compared to a high-fire situation. Conventional burners which are set to operate under low-fire conditions can experience lifting of the flame from the burner nozzle should they be used in a high-fire situation. Thus, in conventional burners, ignition and flame sensing, which are optimized for one flame characteristic, become problematic as the position of the flame alters. Use of a pilot has provided a consistent flame source and ignition sensing. In variable firing conditions, should the fuel/air ratio and secondary air flow be sufficiently unstable at the burner nozzle, remote lighting of the burner becomes difficult. As a result, the industry has typically relied on manual lighting of such burners which has resulted in significant hazard to personnel performing the task.

Additionally, freezing is a common problem with natural draft burner assemblies. Typically, areas of low pressure adjacent the orifice of the burner may result in freezing at the orifice or in the gas lines which feed the orifice. Low flow of fuel at pilot assemblies are even more prone to freezing Clearly, there is interest in the industry to provide a reliable burner which remains lit under ambient conditions, is safe to ignite and operate and permits flame-sensing in both low fire and high fire situations, does not freeze in low ambient temperature and is efficient.

SUMMARY OF THE INVENTION

A burner assembly according to one embodiment of the invention comprises a pilotless ignition and flame sensing system and a burner head having a nozzle tip situated in a secondary air housing and which is equally operable at low and high fire. The nozzle tip discharges a mixture of primary air and gaseous fuel which is separated from the secondary air flowing therearound for stabilizing flame at the nozzle tip. A flame ionization sensor senses flame at the nozzle tip throughout low and high fire operation, obviating the need for a pilot. Secondary air is separated from the nozzle tip by directing the secondary air away from the tip such as through a conical ring situated on the burner head or by an air deflector ring which also serves to swirl the secondary air circumferentially in the housing or in a preferred embodiment, by a combination of both the low pressure ring and the deflector plate manufactured as a unitary structure with the nozzle head. More preferably, the burner assembly comprises a tubular barrel having a mixing chamber at the gas inlet end and a nozzle tip having a plurality of orifices at the burner head end. The mixing chamber can received aspirated primary combustion air, preferably through a plurality of air orifices, or through a forced air inlet.

In a broad aspect of the invention, a burner assembly is provided for mounting in a housing and forming an annular space therebetween, the burner assembly having a nozzle tip mounted in a burner head at a first distal end of a tubular barrel, the tubular barrel having a primary combustion air inlet and a fuel inlet at a second proximal end for providing a flow of primary combustion air and fuel in the tubular barrel directed toward the nozzle tip and a flow of secondary combustion air in the annular space directed towards the nozzle tip, the burner assembly comprising: a deflector for deflecting the flow of secondary combustion air in the annular space away from at least the nozzle tip for stabilizing at least a position of a flame thereon. Preferably, a conical low pressure ring is positioned circumferentially about the nozzle tip and extends radially outwardly from the burner head for substantially separating the flow of primary combustion air and fuel from the flow of secondary combustion air at the nozzle tip creating an area of low pressure at the nozzle tip relative to a pressure of the secondary air in the annulus whereby lifting of the flame from the nozzle tip is reduced.

In another embodiment, a pilotless burner assembly comprises the burner assembly as described above and further comprises an igniter supported in the air deflector for remotely igniting the burner assembly which is positioned adjacent the burner tip and therefore separated from the secondary air. Preferably the igniter further comprises flame sensor.

BRIEF DESCRIPTION OF THE DRAWINGS

FIG. 3 is a bottom perspective view of a burner according to FIG. 1 positioned in the housing, an igniter and heat return tube removed for clarity;

DETAILED DESCRIPTION OF THE PREFERRED EMBODIMENT

Having reference to FIGS. 1-8, a burner assembly 1 according to an embodiment of the invention is shown.

Figure 1:
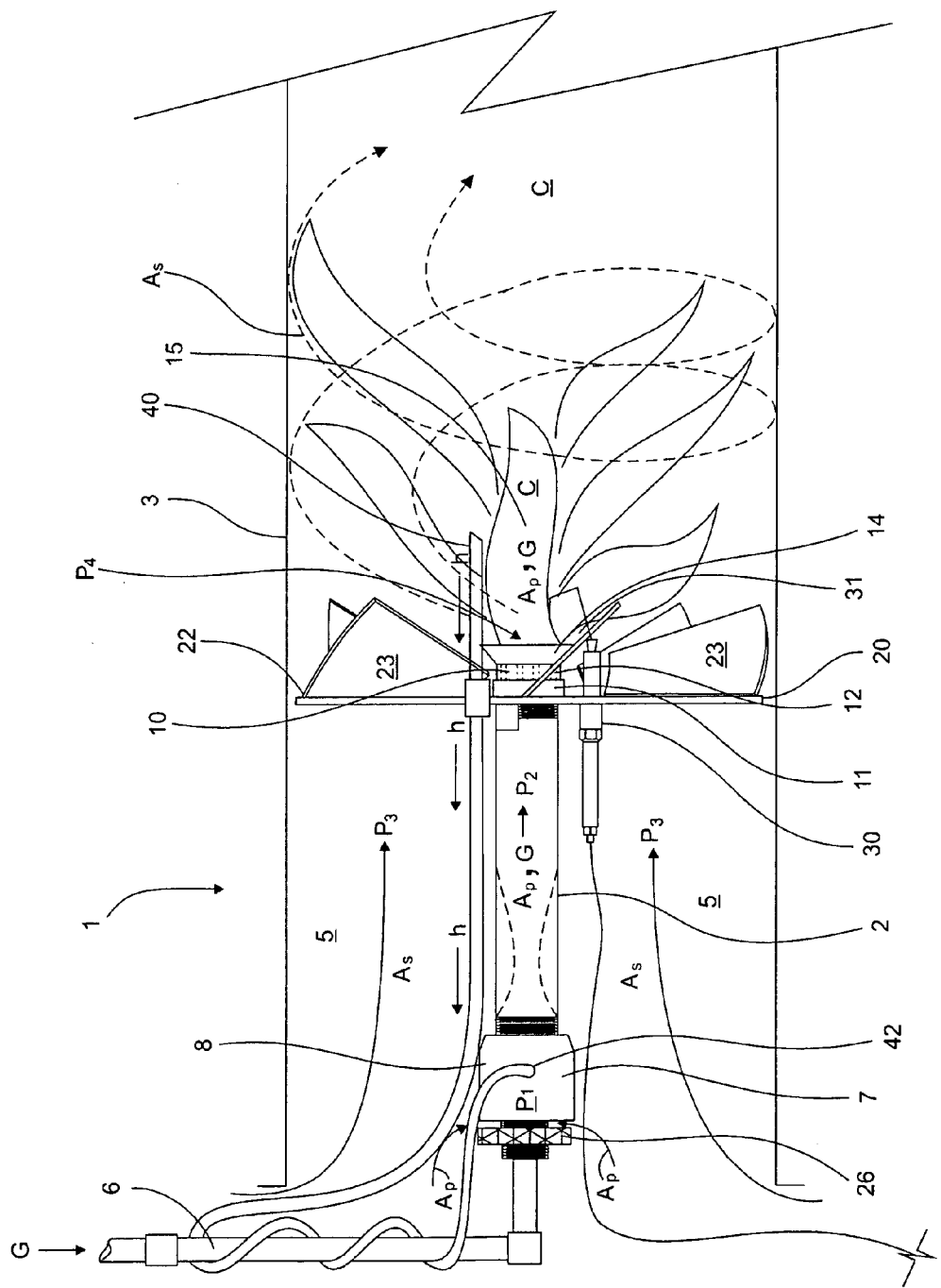
FIG. 1 is a schematic side view of a burner according to an embodiment of the invention and positioned for operation in a firetube or housing.

As shown in FIG. 1, the burner assembly 1 comprises a tubular barrel 2 which is mounted in the bore of a firetube or other such housing 3, forming an annulus 5 therebetween. The tubular barrel 2 conducts primary fuel gas G from a gas inlet 6 at a base or proximal end 8 of the tubular barrel 2 to a burner head 12 at a distal end 11 of the tubular barrel 2. The barrel 2 is typically of conventional configuration. The gas at the gas inlet 6 is fed at a first pressure $P_1$ through an orifice 50 to a mixer head 7 (FIGS. 5, 7 and 8) at the proximal end 8. Primary combustion air $A_p$ is drawn into the mixer head 7 via natural draft and the combined air $A_p$ and gas G are mixed therein and flow through the tubular barrel 2 at a second pressure $P_2$ to an orifice or plurality of orifices 10 in the burner head 12. The air and gas discharge from the burner head 12 at a nozzle tip 13 and, when ignited, form a flame 15.

Secondary combustion air $A_s$ is aspirated or drawn into the annulus 5 and flows therein toward the nozzle tip 13 at a third pressure $P_3$, to mix with the primary air $A_p$ and fuel G and enhance combustion of the primary air $A_p$ and fuel G in a combustion zone C at the nozzle tip 13 and in the housing 3 extending outwardly therefrom. Depending upon the draft created by a pressure differential along the burner assembly 1, the velocity of the secondary air $A_s$ is altered. A chimney effect in an exhaust stack for the heated system (not shown), aids in creating a draft.

In low pressure fuel or low-fire conditions, the velocity of secondary air $A_s$ is relatively low compared to a high-fire condition. If unrestricted, the flow of secondary air $A_s$ up the annulus 5 and past the nozzle tip 13 can adversely affect the flame 15.

In order to stabilize at least a position of the flame 15 relative to the nozzle tip 13, means are provided to deflect the flow of secondary air $A_s$ away from at least the nozzle tip 13.

Figure 4:
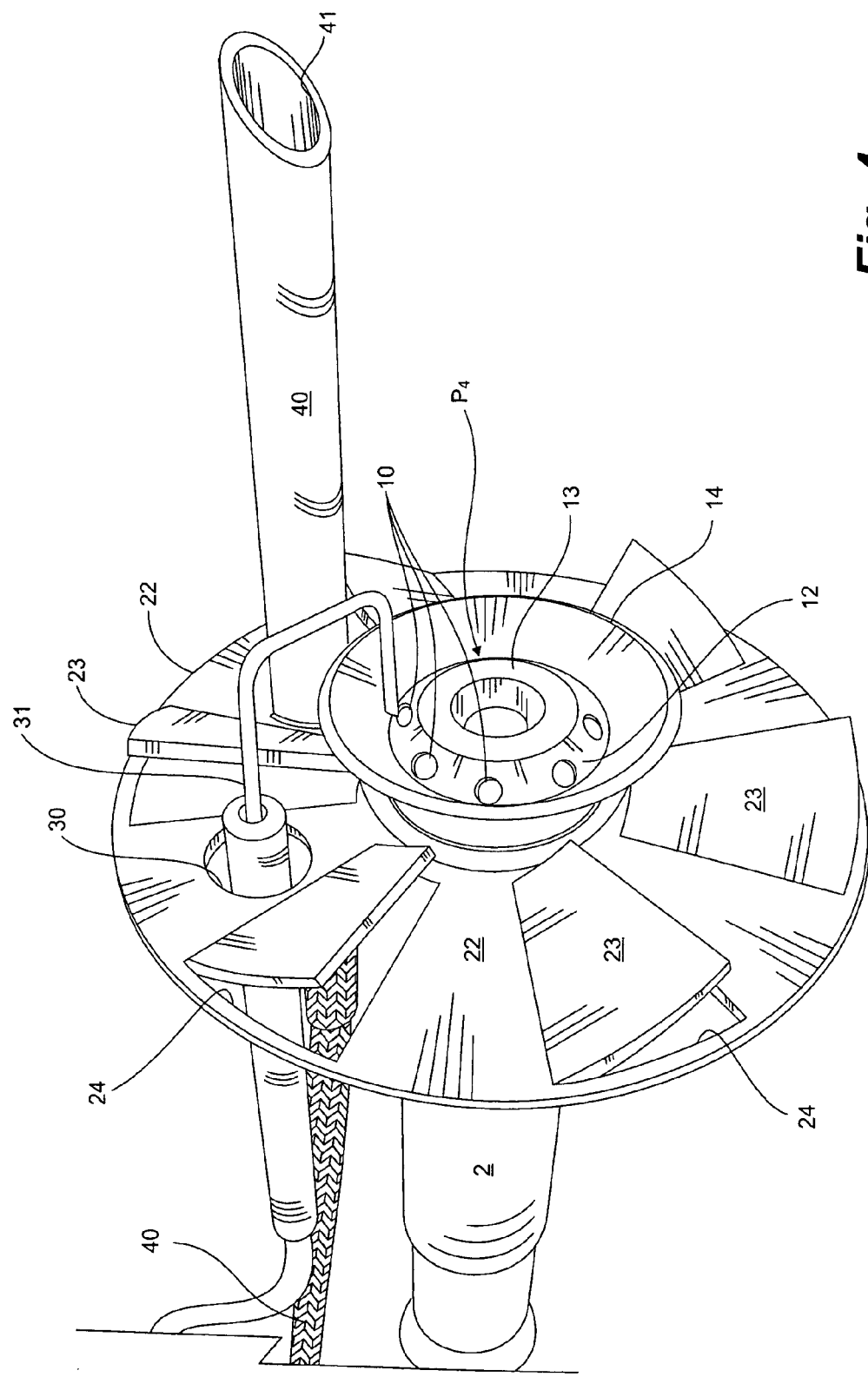
FIG. 4 is a side view of a nozzle portion of the burner according to FIG. 1, the housing removed for clarity and illustrating a heat return tube for preventing freezing of the burner by heat tracing.

In a preferred embodiment, best seen in FIG. 4, the means for deflecting the flow of secondary air $A_s$ is a radially outwardly extending low pressure ring 14 extending from the burner head 12. The low pressure ring 14 is shaped such as an inverted, truncated frustum of a cone and is positioned circumferentially about the nozzle tip 13 of the burner head 12. A diameter of the low pressure ring 14 increases as it extends downstream and away from the nozzle tip 13.

The secondary combustion air $A_s$ flowing through the annulus 5 from the proximal end 8 of the burner assembly 1 to the distal end 11 of the burner assembly 1 and approaching the nozzle tip 13 is deflected outwardly by the low pressure ring 14, typically creating a turbulence pattern in the flow of the secondary air $A_s$ which aids in establishing a local area of low pressure $P_4$ at the nozzle tip 13 and particularly at the plurality of orifices 10. The low pressure $P_4$ at the tip 13 is low relative to the pressure $P_3$ of the secondary air $A_s$. Further, the low pressure ring 14 separates the flow of secondary air $A_s$ from the flow of primary air $A_p$ and fuel G exiting the orifices 10 at the nozzle tip 13 which further aids in maintaining the area of low pressure $P_4$. The area of low pressure $P_4$ acts to minimize lifting of the flame 15 from the nozzle tip 13, resulting in increased stability and reliability of the flame 15 regardless the pressure $P_2$ and velocity of the primary combustion air $A_p$ and fuel G in the burner assembly 1 and the draft in the housing 3. Further, the low pressure ring 14 aids in preventing the flame from being extinguished by the secondary combustion air $A_s$.

Preferably, the nozzle head 12 and the low pressure ring 14 are formed as a unitary structure.

Alternately, as shown in FIGS. 1-4, the means for deflecting the flow of secondary air $A_s$ in the annulus 5 away from at least the nozzle tip 13 is included as part of an air deflector plate 20 which extends radially outwardly from the burner head 12. The deflector plate 20 extends from the burner head 12, such as from an underside 21, and extends radially from the burner head 12 across the annulus 5. The deflector plate has an inner mounting ring 29 adjacent the burner head and extending circumferentially therearound. Preferably, the inner ring 29 can act to restrict and deflect the flow of secondary combustion air $A_s$ away from and around the nozzle tip 13.

Figure 2A:
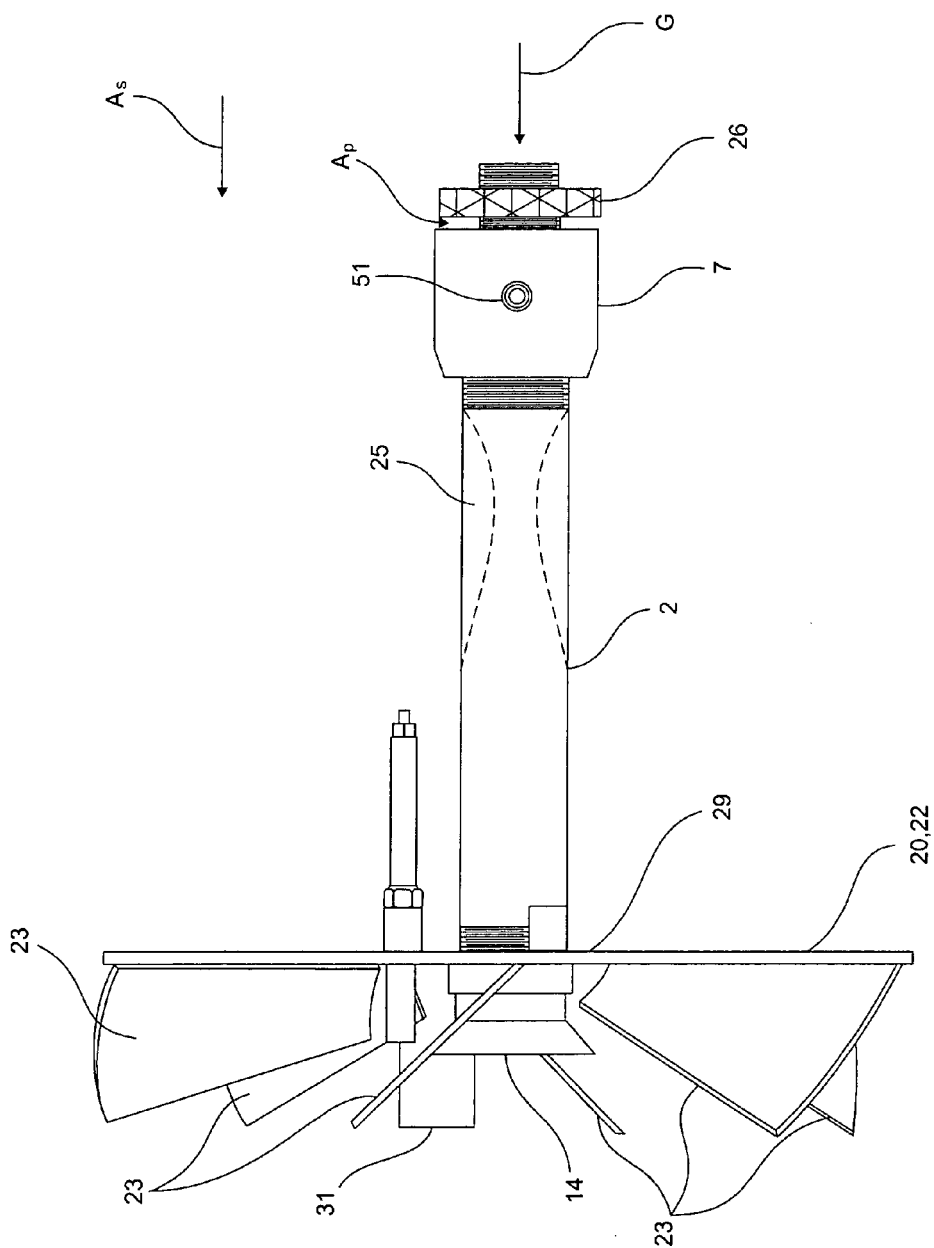
FIG. 2a is a side view of the burner assembly removed from the housing for clarity.
Figure 2B:
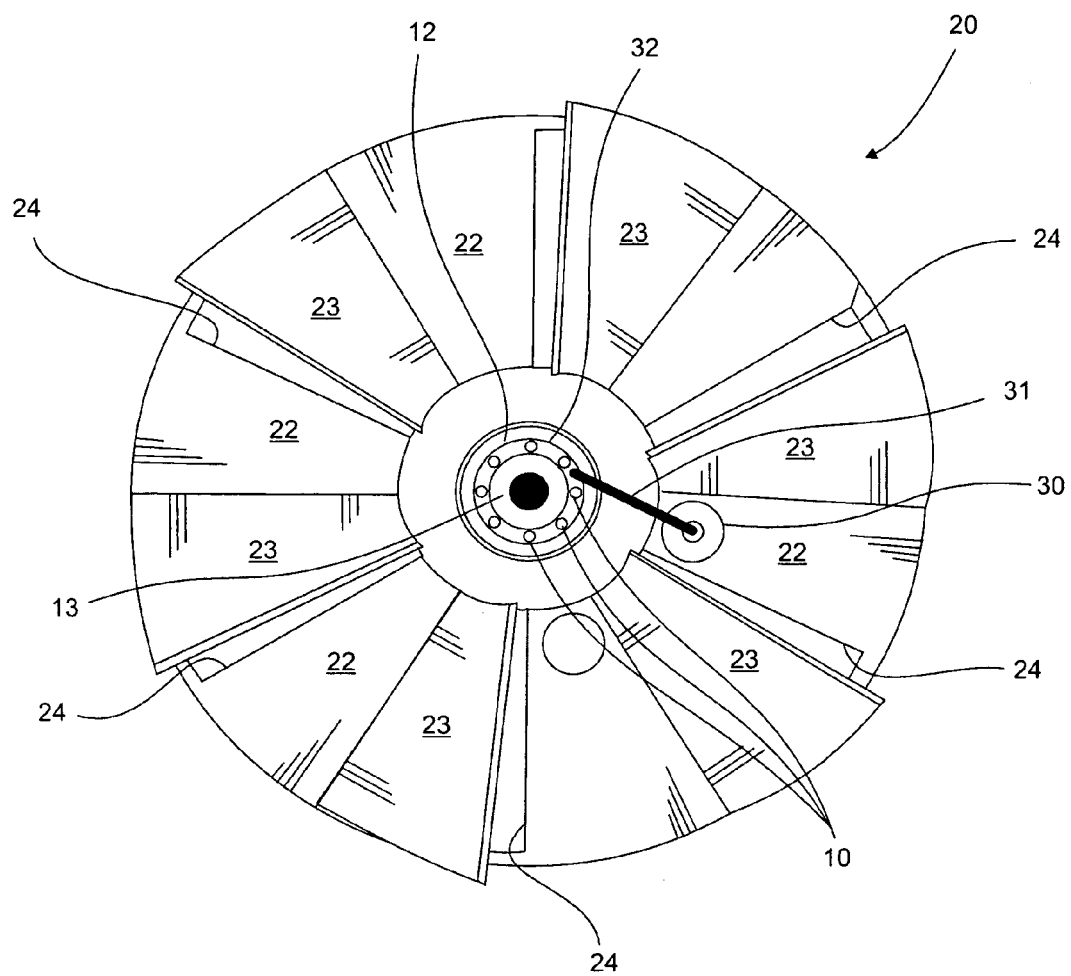
FIG. 2b is a plan view of a deflector plate positioned at a nozzle of the burner according to FIG. 1, the housing being removed for clarity.

As shown in FIGS. 2a, 2b and 3, the air deflector plate 20 comprises a plate base 22, preferably extending radially from the burner head 12 and across a diameter of the housing 3. The burner head 12 can be conveniently supported concentrically in the housing 3 by the air deflector plate 20.

A plurality of angled deflectors or vanes 23 are formed about the plate base 22, each vane 23 being formed adjacent one of a plurality of radially extending openings 24 formed in the plate base 22. The plate base 22 and the openings 24 act to dampen or reduce the pressure $P_3$ the secondary combustion air $A_s$ reaching the burner head 12 and nozzle tip 13. Further, the angled vanes 23 act to direct the secondary combustion air $A_s$ outward and circumferentially to the walls of the housing 3, creating a turbulence pattern therein which substantially fills the housing 3 at the combustion zone C for improved mixing of the primary air $A_p$ and fuel G therein. Preferably, angled vanes 23 also act to restrict and deflect the flow of secondary combustion air $A_s$ away from and around the nozzle tip 13.

Thus, higher efficiency combustion is achieved as a greater amount of the available fuel G is burned in the housing 3. Further, the deflection of at least a portion of the gas/air mixture to the outer walls of the housing 3 caused by the turbulence patterns as described establishes a flame pattern which extends to about the diameter of the housing 3 aiding in a more complete combustion of the gas/air mixture therein.

An angle of the vanes 23 of the deflector plate 20 may be adjustable so as to control the amount of secondary air $A_s$ reaching the housing 3 and the combustion zone C therein and thus the combustion efficiency of the burner assembly 1. Controlling the rate of secondary combustion $A_s$ air further acts to control the draft of the burner assembly 1 which increases the retention time in the housing 3 and permits more efficient heat transfer therein.

Most preferably, as shown in FIGS. 1, 3 and 4, the means for deflecting the flow of secondary air $A_s$ in the annulus 5 away from at least the nozzle tip 13 comprises both the low pressure ring 14 and the deflector plate 20. In this embodiment, the nozzle head 12, low pressure ring 14 and deflector plate 20 are preferably manufactured as a unitary nozzle structure.

As shown in FIGS. 1 and 2a, a venturi sleeve 25 may be positioned within the tubular barrel 2 to accelerate the flow of primary combustion air $A_p$ and fuel G therein causing turbulence which results in enhanced mixing of the primary combustion air $A_p$ and fuel G prior to reaching the orifices 10.

In an embodiment shown in FIG. 4, at least a first port 30 is formed in the air deflector plate 20 to accommodate and support an ignition system, preferably a pilotless ignition system such as an igniter/flame rod 31 for igniting the primary fuel/air mixture exiting the plurality of orifices 10 in the burner head 12. The flame/igniter rod 31 preferably incorporates flame sensing using flame ionization technology. Due to the isolation of the nozzle tip 13 from the direct flow of secondary air $A_s$, a consistent flame 15 is maintained at the nozzle tip 13 and will be detected by the flame sensor regardless whether the burner assembly 1 is operated at low-fire or high-fire conditions. Thus, the burner assembly 1 can be reliably and remotely lit using the igniter/flame rod 31. Incorporation of the igniter/flame rod 31 eliminates the need for a conventional pilot and additional troublesome components associated therewith which are conventionally subject to freezing.

Preferably, the igniter/flame rod 31 is arranged to pass along the housing 3 from the proximal end 8 of the tubular barrel 2, through the air deflector plate 20 and to be positioned with a sparking tip 32 oriented at an optimal sparking distance (such as about ⅛") from the nozzle tip 13.

Also with reference to FIG. 4, in another embodiment, at least one additional port 32 is formed in the air deflector plate 20 to support a heat return tube 40. The heat return tube 40, typically a flexible metal tube, extends from and is in communication with the mixer head 7 at the base 8 of the burner assembly 1. An intermediate length of the heat return tube 40 extends along at least the fuel feed line 6, along the gas inlet orifice 50 to the tubular barrel 2 and along the tubular barrel 2 to extend outward through the additional port 32 into the housing 3 adjacent the burner tip 13, positioning a first intake end 41 adjacent or within the combustion zone C. The heat return tube 40 draws heated combustion gases from the housing 3 into the first intake end 41 of the heat return tube 40 and the heated combustion gases are communicated therealong to a second end 42 at the mixer head 7 to conduct heat and prevent freezing of the components of the burner assembly 1 which are adjacent the heat return tube 40. A pressure differential between the mixer head 7 and housing 3 at the combustion zone C acts to draw the combustion gases into and along the heat return tube 40.

As shown in FIGS. 5-8, the mixer head 7 preferably comprises a tubular housing 60 having a solid base 61 through which a plurality of orifices 62 are formed. Primary combustion air is aspirated through the air orifices 62. The air orifices 62 extend into a mixing chamber 63 formed in the tubular housing 60. The mixing chamber 63 is positioned intermediate the air orifices 62 and the tubular barrel 2 which is connected thereto. The gas inlet orifice 50 is formed at a center of the base 61 through which fuel G is introduced to the mixing chamber 63 from the gas inlet 6. Fuel/primary combustion air $G/A_p$ combined in the mixing chamber 63 are discharged into the tubular barrel 2. The plurality of orifices 62 act to minimize or prevent gusts of primary combustion air $A_p$ from entering the mixer 7 which is particularly advantageous in low velocity fuel conditions.

An air shutter 26 is provided at the base 61 of the mixer head 7 for controlling the amount of primary combustion air $A_p$ entering the air orifices 62. Preferably the air shutter 26 is threaded onto a gas inlet nipple 64 extending outward from the mixer base 61. The air shutter 26 can be moved along the nipple 64 away from and toward the base 61 of the mixer 7 to permit more or less air to pass thereby into the air orifices 62.

Preferably, the fuel orifice 50 is provided in a fuel orifice insert 65 which is threadably connected into the mixer base 61. The size of the fuel orifice 50 can be altered by swapping the insert 65 for an insert 65 having a different size fuel orifice 50.

Figure 5:
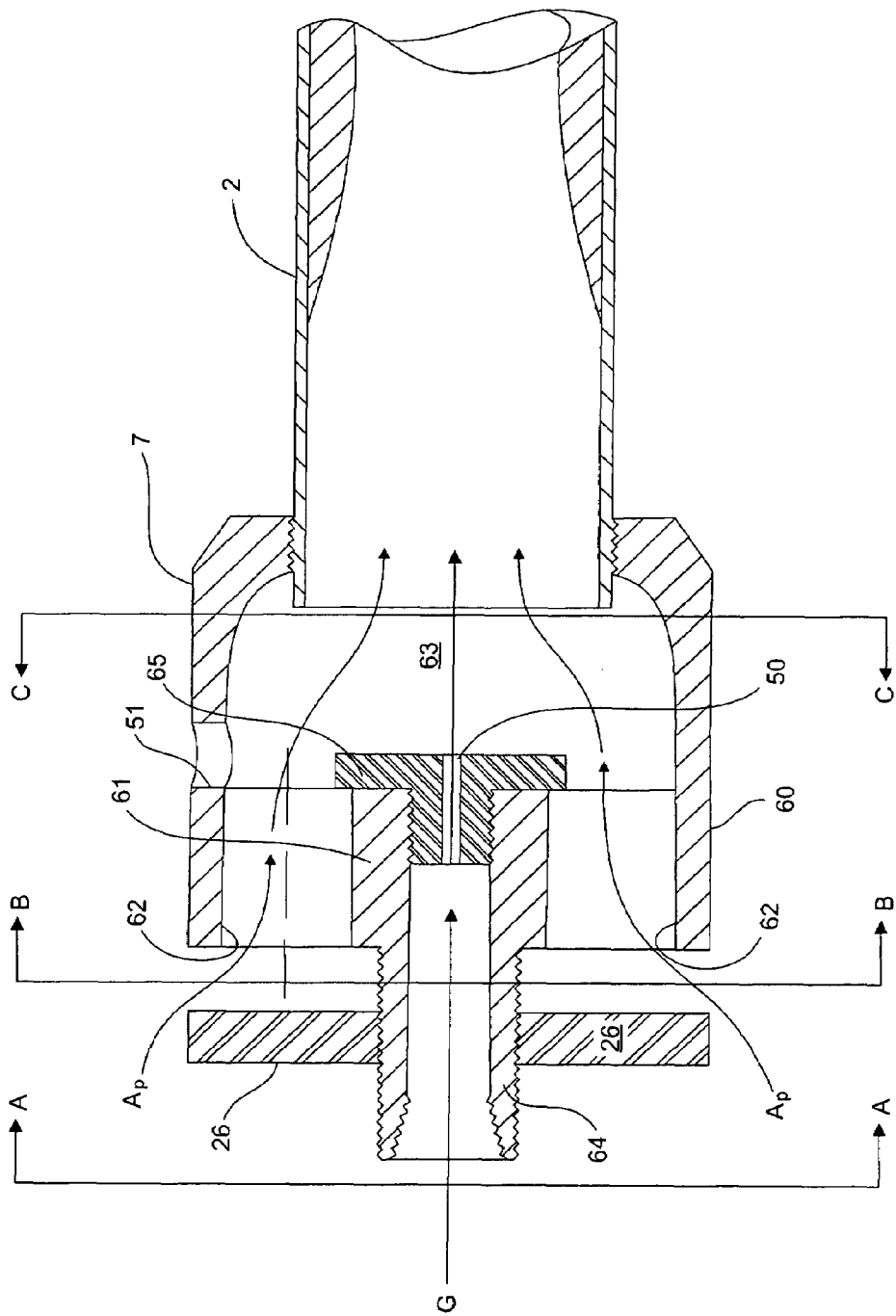
FIG. 5 is a schematic side view of a mixer head according to FIG. 1.
Figure 6:
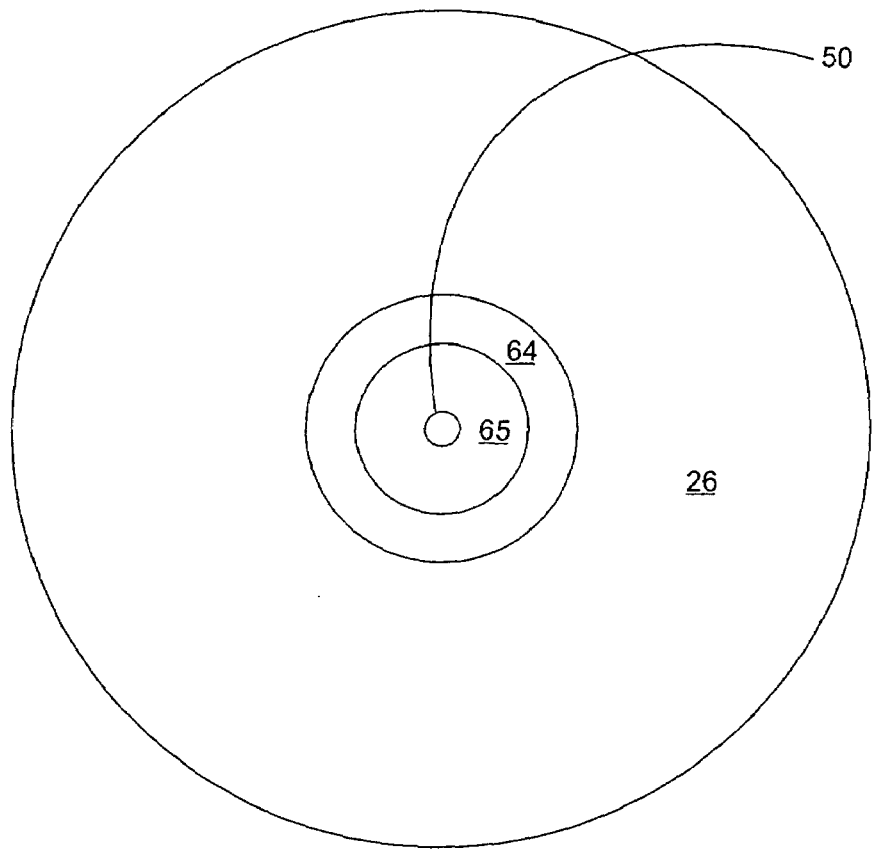
FIG. 6 is a plan view of the mixer head according to FIG. 5 shown along section lines A-A.
Figure 7:
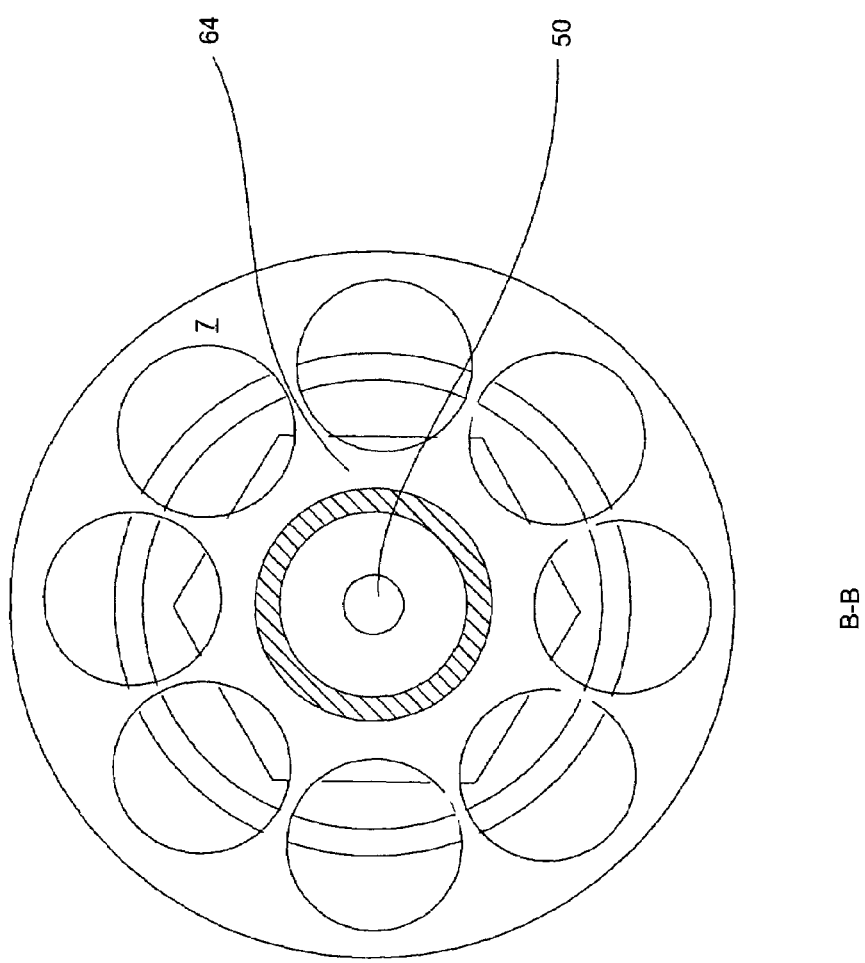
FIG. 7 is a sectional view of the mixer head according to FIG. 5 shown along section lines B-B.
Figure 8:
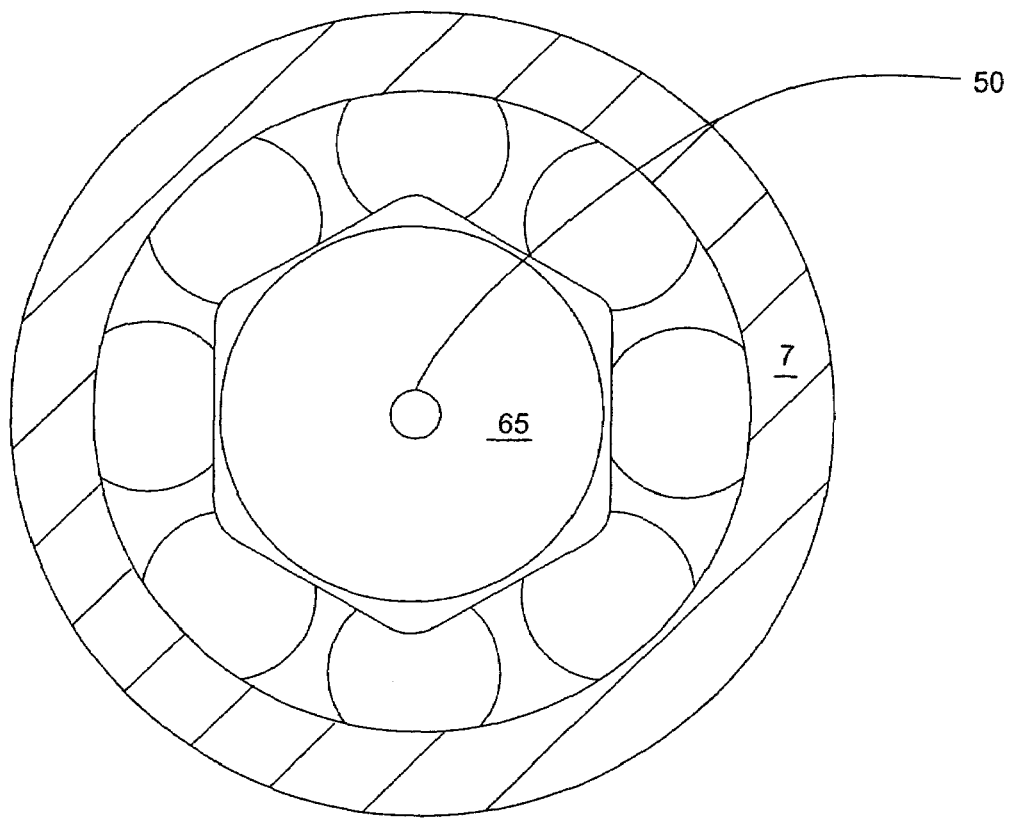
FIG. 8 is a sectional view of the mixer head according to FIG. 5 shown along section lines C-C.

Alternatively, in another embodiment of the invention as shown in FIGS. 5, 6 and 8, the burner assembly 1 further comprises an auxiliary air inlet 51 in the mixer head 7 through which primary combustion air $A_p$ may be forced into the flow of fuel G in the mixer head 7 prior to entering the tubular barrel 2. In this situation, the air shutter 26 at the base 8 of the burner assembly 1 can be closed completely and the flow of primary combustion air $A_p$ is controlled through the forcible addition of air through the auxiliary air inlet 51. The flow of fuel gas G is controlled by adjusting the size of the fuel orifice 50 in the mixer head 7. In this embodiment, the burner assembly 1 can operate as a forced draft burner assembly, which may be preferable in cases where a more precise control of the primary combustion air/fuel ratio $A_p/G$ is required. Secondary air $A_s$ continues to be aspirated as in the natural draft embodiment.

Applicant has found this unique burner assembly operates at efficiencies in the order of 7-10% more efficient than other natural draft burners and can operate efficiently at pressures ranging from about 0.25 psig to about 15 psig. Burners employing this unique design can be manufactured to range in size from about 1"×6" to about 2"×24". Those skilled in the art would appreciate these specifications are guidelines only and the burner of the present invention is not limited to these dimensions or pressure ranges.

What is claimed is:

1. A burner assembly for mounting in a housing and forming an annular space therebetween, the burner assembly having a nozzle tip mounted in a burner head at a first distal end of a tubular barrel, the tubular barrel having a primary combustion air inlet and a fuel inlet at a second proximal end for providing a flow of primary combustion air and fuel in the tubular barrel directed toward the nozzle tip and a flow of secondary combustion air in the annular space directed towards the nozzle tip, the burner assembly comprising:

means deflecting the flow of secondary combustion air in the annular space away from at least the nozzle tip for substantially separating the flaw of primary combustion air and fuel from the flow of secondary combustion air creating an area of low pressure at the nozzle tip relative to a pressure of the secondary air in the annulus whereby lifting of the flame from the nozzle tip is reduced and at least a portion of the flame is stabilized thereon.

2. The burner assembly of claim 1 wherein means deflecting the flow of secondary combustion air in the annular space away from at least the nozzle tip comprises:

a conical low pressure ring positioned circumferentially about the nozzle tip and extending radially outwardly from the burner head for substantially separating the flow of primary combustion air and fuel from the flow of secondary combustion air at the nozzle tip.

3. The burner assembly of claim 2 wherein the conical, radially outwardly extending low pressure ring is shaped as an inverted, truncated frustum of a cone.

4. The burner assembly of claim 2 wherein the nozzle head and the low pressure ring are manufactured as a unitary structure.

5. The burner assembly of claim 1 wherein means deflecting the flow of secondary combustion air in the annular space from at least the nozzle tip comprises:
an air deflector plate extending from an inner ring at the burner head and radially outwards therefrom, the deflector plate deflecting the flow of secondary combustion air in the annular space away from at least the nozzle tip, the air deflector plate having a plurality of radially extending openings formed therein, each opening having an upstanding radially extending vane formed therealong for deflecting secondary combustion air circumferentially therefrom, the openings and the vanes acting to reduce a velocity of the secondary air passing therethrough towards the nozzle tip and for creating a turbulence pattern therein.

6. The burner assembly of claim 5 wherein the air deflector plate extends substantially across a diameter of the housing.

7. The burner assembly of claim 5 wherein the nozzle head and air deflector plate are manufactured as a unitary structure.

8. The burner assembly of claim 5 wherein the turbulence pattern of the secondary air passing from the annulus and deflected through the plurality of openings and vanes causes the secondary air to substantially mix with the primary combustion air and fuel exiting the nozzle tip at a combustion zone in the housing for improving efficiency of combustion of fuel therein.

9. The burner assembly of claim 5 wherein an angle of the vanes is adjustable for adjusting the amount of secondary combustion air at the combustion zone.

10. The burner assembly of claim 5 further comprising:
a conical low pressure ring positioned circumferentially about the nozzle tip and extending radially outwardly from the burner head for substantially separating the flow of primary combustion air and fuel from the flow of secondary combustion air at the nozzle tip.

11. The burner assembly of claim 10 wherein the nozzle head, air deflector plate and low pressure ring are manufactured as a unitary structure.

12. A pilotless burner assembly comprising the burner assembly of claim 5 further comprising an igniter supported in the air deflector plate and positioned adjacent the burner tip for remotely igniting the burner assembly.

13. The pilotless burner assembly of claim 12 wherein the igniter is supported in a port formed in the air deflector plate.

14. The pilotless burner assembly of claim 12 wherein the igniter further comprises a flame sensor.

15. The burner assembly of claim 5 further comprising:
means for conducting heat from the combustion zone along at least a portion of the burner assembly for preventing freezing of the burner assembly in low ambient temperature.

16. The burner assembly of claim 15 wherein the means for conducting heat is an intake tube comprising:
a first intake end positioned in the combustion zone;
a second end connected adjacent the mixer; and
an intermediate length of the intake tube being positioned adjacent an external surface of at least a fuel inlet tube,
wherein a pressure at the intake end is higher than at the second end for inducing heated combustion gases to enter the intake's inlet end and to be drawn to the intake's second end.

17. The burner assembly of claim 16 wherein at least the first intake end of the intake tube is mounted in the air deflector plate for positioning the intake end in the combustion zone.

18. The burner assembly of claim 16 wherein the intermediate length of the intake tube is further positioned adjacent at least the tubular barrel and the mixer.

19. The burner assembly of claim 1 wherein the tubular barrel further comprises a venturi sleeve positioned therein for accelerating the flow of fuel and primary combustion air therein.

20. The burner assembly of claim 1 further comprising:
a mixing chamber for combining the primary combustion air and fuel therein, the mixing chamber being fluidly connected to the tubular barrel for supplying the primary air and fuel mixture thereto;
a fuel orifice for admitting a flow of fuel therethrough to the mixing chamber; and
a plurality of air orifices through which primary combustion air is aspirated and directed into the mixing chamber.

21. The burner assembly of claim 20 further comprising an air shutter for further controlling the flow of primary air through the plurality of air orifices.

22. The burner assembly of claim 21 further comprising:
an auxiliary air inlet into the mixing chamber for providing a forced flow of primary combustion air to the mixing chamber,
wherein the air shutter can be closed to prevent aspiration of primary air through the plurality of air orifices.

* * * * *